(12) United States Patent
Metzger et al.

(10) Patent No.: US 6,829,248 B1
(45) Date of Patent: Dec. 7, 2004

(54) INTEGRATED SWITCHING SEGMENTATION AND REASSEMBLY (SAR) DEVICE

(75) Inventors: Michael M. Metzger, Boulder, CO (US); Uve W. Rick, Broomfield, CO (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/262,882

(22) Filed: Mar. 8, 1999

(51) Int. Cl.[7] .................. H04L 12/28; H04L 12/56; H04J 3/24

(52) U.S. Cl. .................................. 370/466; 401/474

(58) Field of Search .................. 370/395.1, 396–399, 370/395.5, 395.52, 395.53, 395.6, 395.63, 401, 409, 474, 465–467

(56) References Cited

U.S. PATENT DOCUMENTS 6,226,260 B1 * 5/2001 McDysan .................. 370/401
6,249,528 B1 * 6/2001 Kothary ..................... 370/466
6,370,142 B1 * 4/2002 Pitcher et al. .............. 370/390
6,466,997 B1 * 10/2002 Ross et al. .................. 710/48

* cited by examiner

*Primary Examiner*—Dang Ton
*Assistant Examiner*—Ronald Abelson
(74) *Attorney, Agent, or Firm*—Foley & Lardner LLP

(57) ABSTRACT

A communication system for communication of data packets or cells associated with a packet or cell switched network is disclosed herein. The system includes a plurality of ports and a switching segmentation and reassembly device. The switching segmentation and reassembly device routes data packets or cells to and from the ports and the at least one destination. The switching segmentation and reassembly device further switches data packets or cells between ports. The switching segmentation and reassembly device switches cells from cell ports to packet ports by reassembling cells into packets and manipulation of information. The switching segmentation and reassembly device switches packets from packet ports to cell ports by segmenting packets into cells and manipulation of header information.

20 Claims, 10 Drawing Sheets

INTEGRATED SWITCHING SEGMENTATION AND REASSEMBLY (SAR) DEVICE

FIELD OF THE INVENTION

The present invention relates generally to communication systems. More particularly, the present system relates to the cell or packet switching, assembly and disassembly associated with cell or packet switched networks.

BACKGROUND OF THE INVENTION

Various systems have been adopted to carry digitally-encoded signals for communication applications, such as, telephone, video, and data services. These systems are often connection-oriented transmission systems, such as, asynchronous transfer mode (ATM) systems, frame relay systems, X.25 systems, or other transmission systems. Connection-oriented systems (e.g., ATM systems) have been employed in private and public communication systems or networks (e.g., wide area networks (WANs)) to transfer packetized signals (e.g., data cells or protocol data units) across communication lines, such as, telephone lines, cables, optical fibers, air waves, satellite links, or other communication media. Cell based networks transfer data units of a constant length, while packet based networks transfer data units of variable length. Therefore, the term packet used herein refers to variable sized data units, as in IP networks or frames as well as in Ethernet or token ring networks.

Generally, ATM systems are comprised of nodes or elements which communicate information in cells between each other to ultimately transfer information from a source to a destination. The node or element can be an ATM switch, a port or edge device, computer equipment, communication device, or any apparatus for relaying information. Each of the data cells communicated in an ATM system contains headers identifying the connection and also contains a payload providing the information being transmitted and received. During the transfer of the cells throughout the network to the destination, the headers may be changed to indicate the path that the cell is following to reach the receiving equipment.

ATM systems are typically coupled to telephones, modems, other networks, or other communication devices through a port or edge device. The port or edge device receives data cells from the ATM system and transforms these into data units and provides the data units to the systems coupled thereto. Additionally, the edge device receives data units from the systems coupled thereto and provides data cells representative of the data units to the ATM system. Thus, the edge device can provide translation and routing functions, such as adaptation, segmentation, and reassembly operations to interface the systems coupled to it to the ATM system. The edge device often must adapt the data cells of the ATM system to the formats of the systems coupled thereto. The edge device can be an adapting network interface card, an adapting switch, an adapting concentrator, an ATM desktop device, a router access multiplexer, or other interface device.

ATM systems generally include the capability of distinguishing between cell generating, cell terminating, and cell switching elements in the ATM network. The generation or segmentation of data packets into cells on the data source side of an ATM network as well as the reassembly of cells into data packets on the data destination side of an ATM network can be performed by a segmentation and reassembly (SAR) device. U.S. Pat. No. 5,768,275, issued on Jun. 16, 1998, to Lincoln et al., entitled "Controller for ATM Segmentation and Reassembly," the disclosure of which is incorporated herein by reference, discloses one such SAR device.

Conventional SAR devices segment packets received from an attached processor (as a source of communication) into cells. Such SAR devices also reassemble received cells and forward them to the attached processor (as a destination for communication). The content of the cells is stored in buffers. The SAR device has a pool of free buffers in a free buffer queue. When a data packet is received by the SAR device from one of the input ports, the SAR device reads a free buffer and buffer descriptor from a free buffer pool. The SAR device writes the data packet information into the free buffer and writes the buffer descriptor to a reassembly status queue. The processor (as a destination of the communication) reads the buffer descriptor from the reassembly status queue, processes the data contained in the buffer, and writes the buffer and buffer descriptor back to the free buffer pool.

For data transmission, the processor (as a source of communication) writes communication data to buffers and writes their corresponding buffer descriptor to the transmit queue. The SAR device segments the buffers, transmits the cells, and then returns the buffers to the processor by writing the buffer descriptors to a segmentation status queue. The processor reads the buffer descriptor and makes the corresponding buffers available for future transmission.

Conventionally, the switching of cells in an ATM system is performed by an ATM switch. An ATM switch routes cells from any of its input ports to any of its output ports. Furthermore, the ATM switch modifies the header information of each cell to indicate the path that the cell is following to reach its destination. Conventional ATM systems do not integrate cell generating, cell terminating, and cell switching operations into one element in the ATM network.

Thus, there is a need for the integration of segmentation, reassembly, and switching functions into one device or element in the ATM system. Further, there is a need to combine the operations of cell generation or termination and cell switching. Even further, there is a need for a node in the ATM network to be able to perform as a communication source, destination, and switch. Even further, there is a need for a node at the interface between ATM networks and packet based networks to perform switching between any combination of packet and cell ports, segmenting of packets into cells, and reassembling cells into packets.

SUMMARY OF THE INVENTION

One embodiment of the invention relates to a communication system for communication of data packet or cells associated with a packet or cell switched network. The system includes a plurality of ports and a switching segmentation and reassembly device. The ports communicate data packets or cells to and from at least one communication source (e.g. an attached processor) and at least one destination. The switching segmentation and reassembly device routes data packets or cells to and from the ports and the at least one destination. The switching segmentation and reassembly device further switches data packets or cells between ports.

Another embodiment of the invention relates to a communication apparatus for communication of data packets or cells associated with a packet or cell switched network to a plurality of ports. The apparatus includes an interface, a memory, and a segmentation and reassembly block. The interface couples the plurality of ports to the communication apparatus. The memory stores the content of data packets received from the plurality of ports and information on virtual channels to the plurality of ports. The segmentation and reassembly block assembles data packets, processes data from memory, writes the buffer descriptor corresponding to the received data packet to memory for future transmission, segments data packets, and transmits data packets to the corresponding destination port.

Another embodiment of the invention relates to a method for communication of data packets or cells associated with a packet or cell switched network in a communication system from a source physical device to a destination physical device. The method includes receiving a data packet or cell including a header and payload from the physical device; assigning the data packet or cell received to a connection identifier; making necessary changes to data packet or cell header; segmenting received packets into cells; reassembling received cells into packets; and communicating data packet or cells to the destination physical device as indicated by the connection identifier.

BRIEF DESCRIPTION OF THE DRAWINGS

The invention will become more fully understood from the following detailed description, taken in conjunction with the accompanying drawings, wherein like reference numerals denote like elements, in which.

DETAILED DESCRIPTION OF THE PREFERRED EMBODIMENTS

Figure 1:
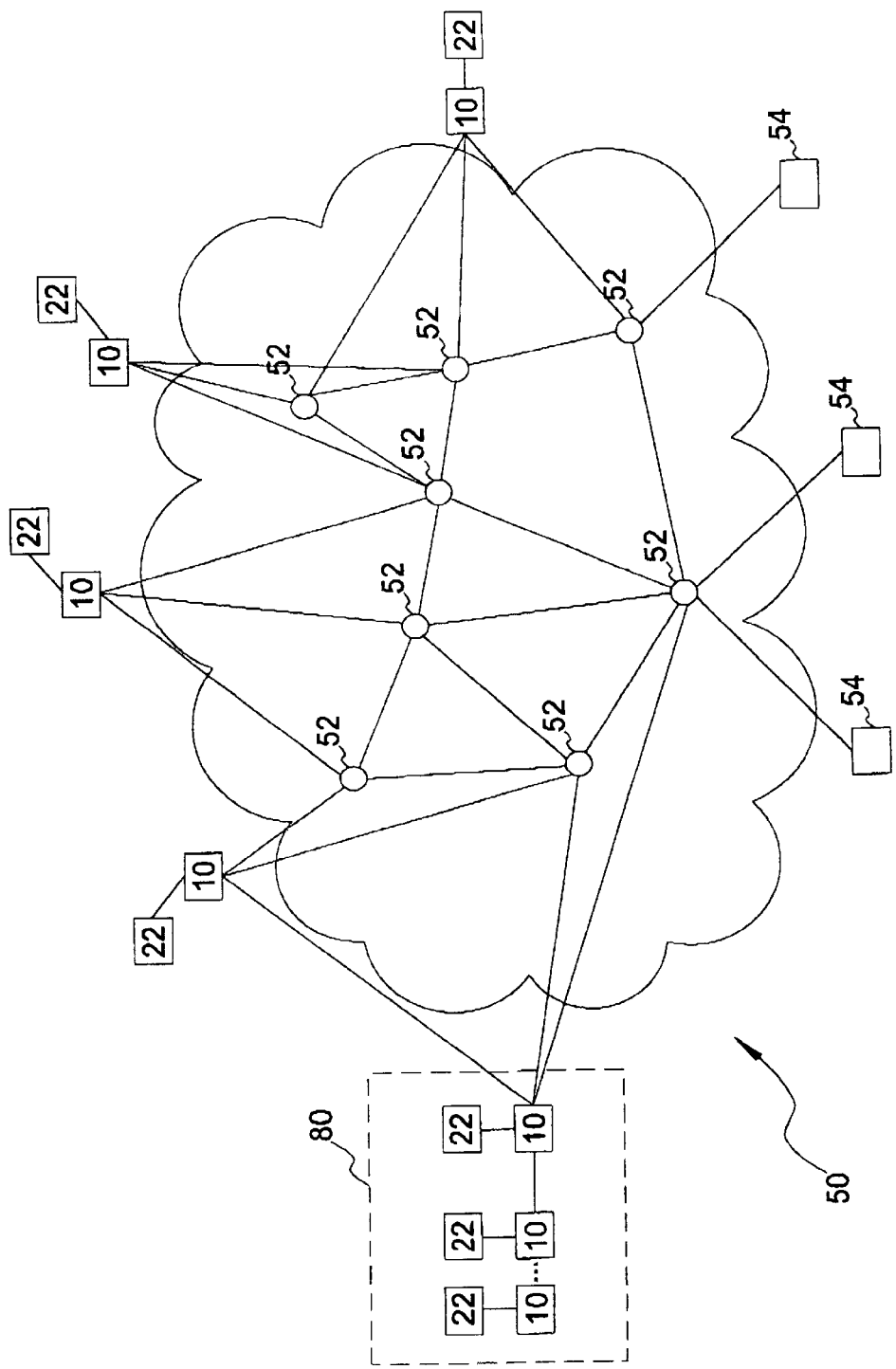
FIG. 1 is a block diagram of a network incorporating an apparatus performing both switching of data packets or cells and segmentation/reassembly functions in accordance with the present invention.

FIG. 1 illustrates a block diagram of a communication network 50 incorporating an apparatus 10. Network 50 includes several interconnected nodes 52. Nodes 52 in network 50 which are not communication sources or communication destinations operate as switches, directing communication toward another node 52 in network 50 or to a destination. Conventional sources/destinations 54 are connected to network 50 but do not provide for switching operations. Apparatus 10 is alternatively coupled to other nodes 52, conventional sources and destinations 54, or other apparatus 10.

Apparatus 10 is coupled to a processor 22 which can be a source or destination of data traffic. Advantageously, apparatus 10 provides for cell generating, cell terminating, and cell switching operations. Thus, apparatus 10 integrates the operations of a communication source, a communication destination, and a switch into one device.

Apparatus 10 can be included in a cell switched network such as an asynchronous transfer mode (ATM) network. The present invention is not, however, limited to cell based networks. The system in which apparatus 10 is included could be a packet based network (e.g., IP).

Figure 2:
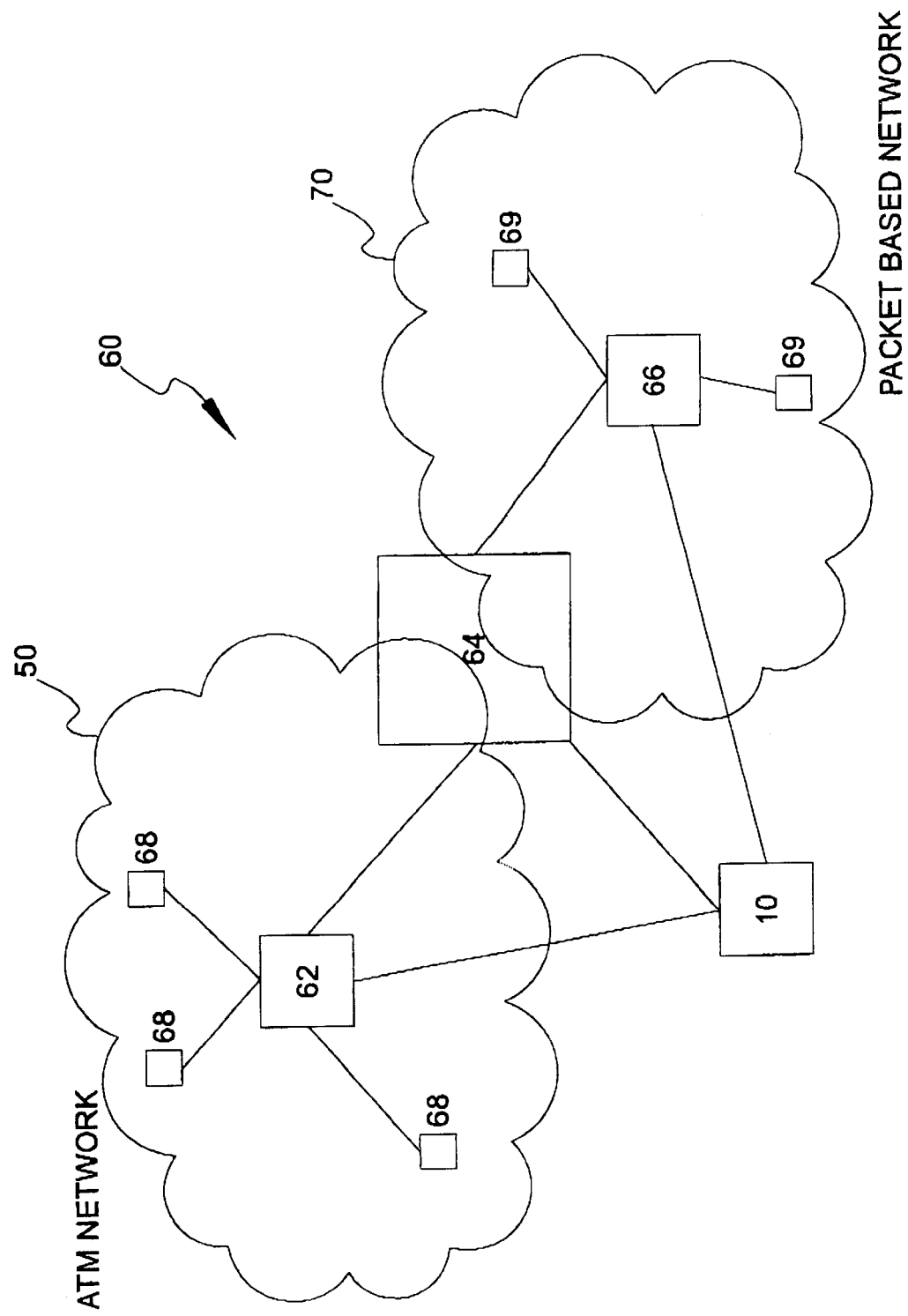
FIG. 2 is a block diagram of a network incorporating the apparatus of FIG. 1 in a packet based and a cell based network.

FIG. 2 illustrates a block diagram of a communication system 60 incorporating apparatus 10. Communication system 60 includes a network 50 and a network 70. Network 50 is a cell based network and network 70 is packet based network. Network 50 includes a switch 62, an edge device 64, and nodes 68. Network 70 includes a switch 66, edge device 64, and nodes 69. Edge device 64 interfaces network 50 (a cell based network) and network 70 (a packet based network).

Apparatus 10 can switch cells in network 50, switch packets in network 70, and switch cells or packets between network 50 and network 70. Where cells or packets are switched between network 50 and network 70, packets from network 70 are segmented into cells for network 50, while cells from network 50 are reassembled into packets for network 70.

Figure 3:
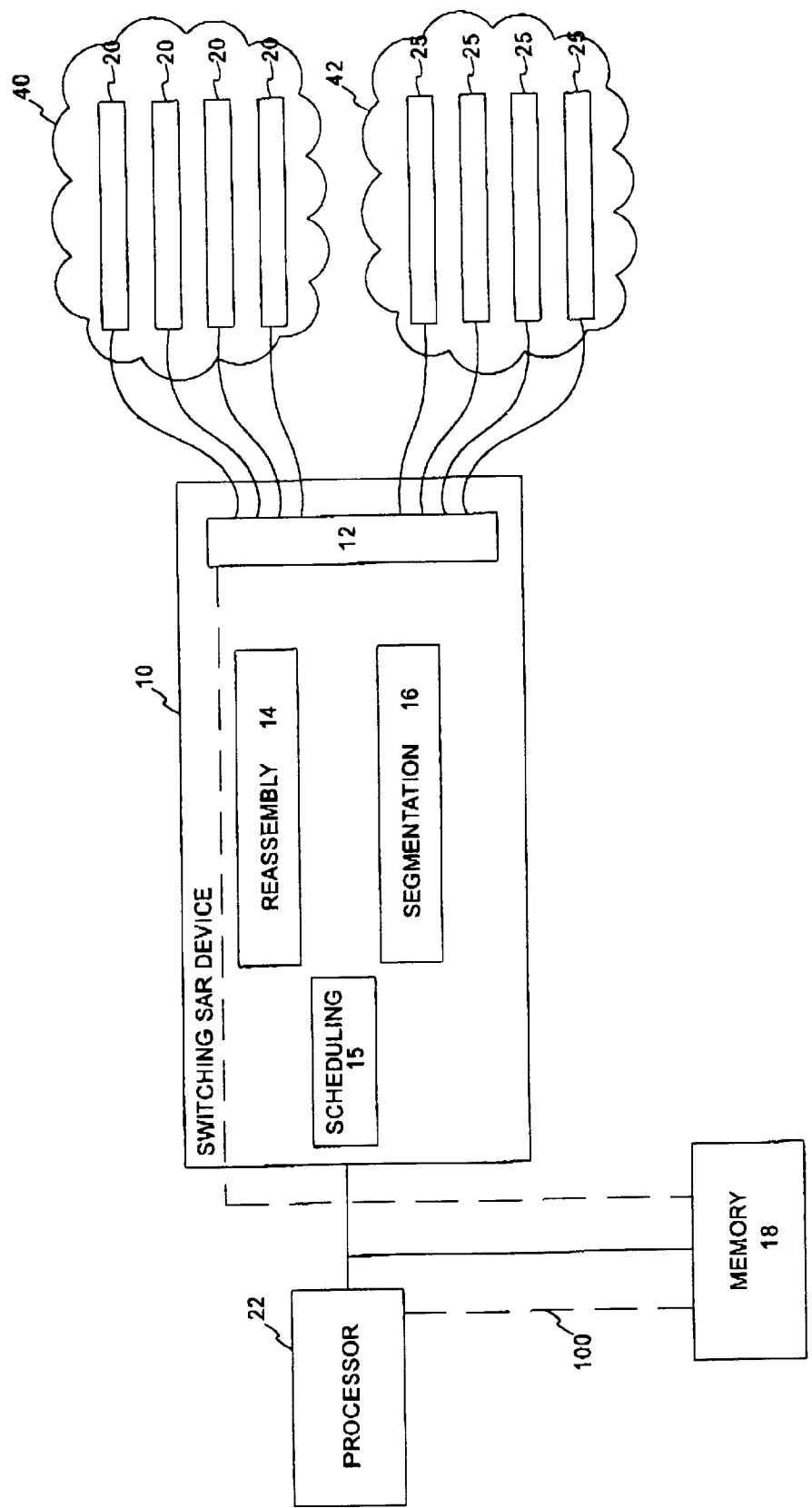
FIG. 3 is a general block diagram of the apparatus of FIG. 1 in a packet or cell switched system.

FIG. 3 illustrates a block diagram of the exemplary embodiment of apparatus 10 in a packet or cell switched system. Apparatus 10 performs switching, segmentation and reassembly functions. Apparatus 10 advantageously combines these functions into one device, thereby achieving reduced size, cost to manufacture and operate, and power requirements. The integration of these functions also can result in other advantageous implementations, including a data traffic shaper, an ADSL multiplexer/demultiplexer, and other applications.

In the exemplary embodiment, apparatus 10 includes an interface 12, a reassembly block 14, a schedule block 15, and a segmentation block 16. Interface 12 provides for apparatus 10 to be in communication with multiple physical devices 20 and 25. In one embodiment, interface 12 is a UTOPIA interface, manufactured by Conexant Systems, Inc. Physical device 20 is part of a cell based network 40, while physical device 25 is part of a packet based network 42. Any combination of devices 20 and 25 communicate with apparatus 10.

In an ATM network, data packets are transmitted and received through interface 12 as data cells. In packet based networks, data packets are received through interface 12 as data packets.

Reassembly block 14 performs data packet manipulation, including the reassembly of data cells received from physical devices 20 and data packets received from device 25. Reassembly block 14 transfers the content of a received cell or packet to memory 18. Segmentation block 16 performs data cell and packet manipulation, including changing header information to reflect the communication path taken by the data and segmenting data for transmission to physical devices 20 and 25. Segmentation block 16 reads the contents of a cell or packet from memory 18.

Memory 18 is a Static Random Access Memory (SRAM), Dynamic Random Access Memory (DRAM), or any of a variety of storage devices. In one embodiment (FIG. 8), memory 18 includes free buffer queues 70, a segmentation status queue 72, a reassembly status queue 73, and transmit queues 74. Memory 18 can be integral to or separate from apparatus 10. Additionally, memory 18 includes a packet memory 76 and a cell memory 78. Packet memory 76 and cell memory 78 are any of separate storage devices, portions of memory 18, and combination of separate storage devices and portions of memory 18.

Exemplary segmentation, reassembly, and storage operation of apparatus 10 can be performed by circuitry similar to the RS8234 Service Segmentation and Reassembly Controller, manufactured by Conexant Systems, Inc. The exemplary segmentation and reassembly operations are also described in U.S. Pat. No. 5,768,275, issued on Jun. 16, 1998, to Lincoln et al., entitled "Controller for ATM Segmentation and Reassembly," and herein incorporated by reference.

Apparatus 10 provides for segmentation and reassembly of communications to or from a processor 22. Operating as a communication source, processor 22 sends data to apparatus 10 via memory 18. Data is segmented into data cells by segmentation block 16 and then transmitted to cell based network 40. No segmentation is performed for packet based networks, such as network 42.

Operating as a communication destination, processor 22 receives data from apparatus 10 after the data has been reassembled by reassembly block 14. The flow of such reassembly and segmentation operation (where microprocessor operates as either a communication source and a communication destination) is illustrated in FIG. 3 by a dashed line 100.

Operating as a communication switch, apparatus 10 operates in one of at least four modes of operation. FIGS. 4–7 illustrate the different types of modes of operation, including the data flow and control flow during each operation.

Figure 4:
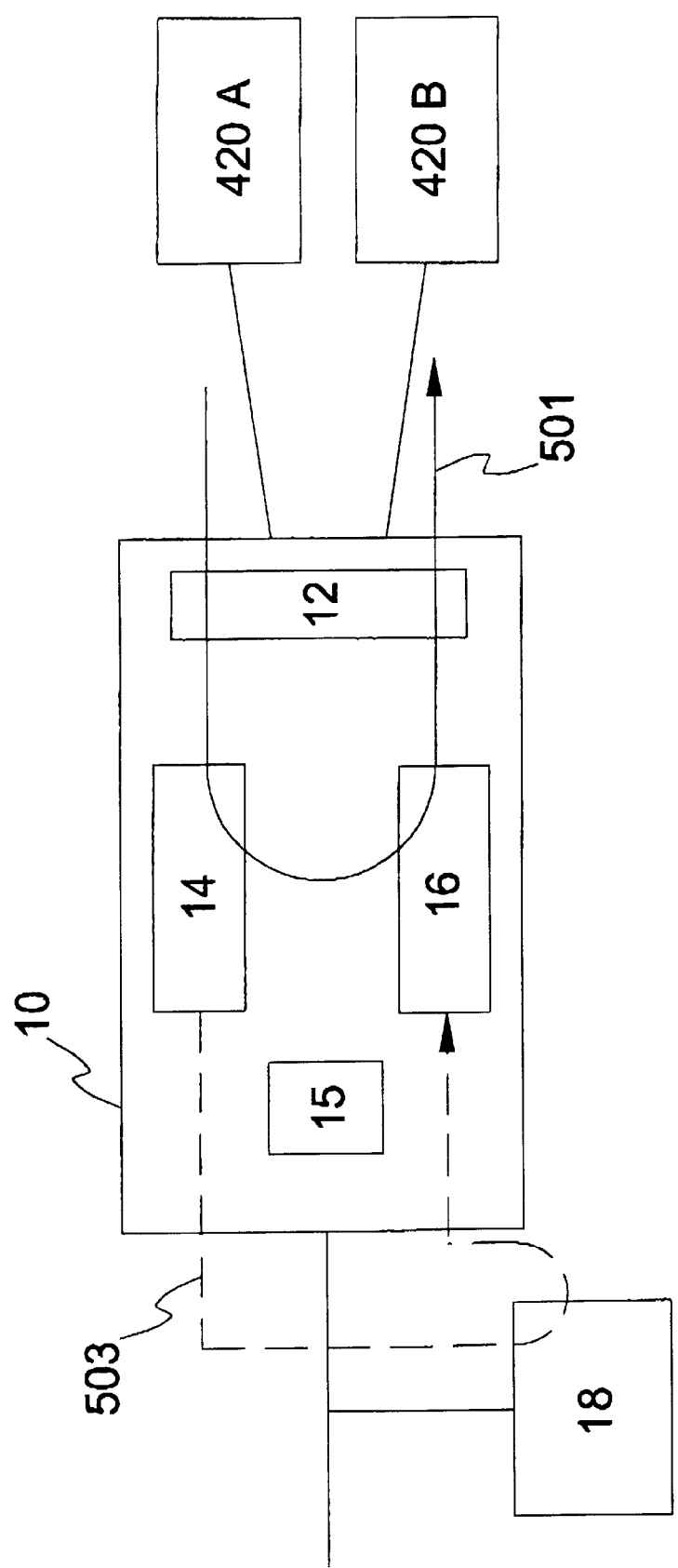
FIG. 4 is a block diagram of the apparatus of FIG. 3, illustrating the flow of data and control when a cell communication port communicates with another cell communication port.

FIG. 4 is a block diagram of apparatus 10 operating in a first mode of operation. The first mode of operation is characterized by a cell-type physical device 420A as a communication source and a cell-type physical device 420B as a communication destination. Device 420A sends data cells to apparatus 10. Apparatus 10 operates as a switch by routing the data cells to the corresponding destination device 420B. No segmentation or reassembly is performed on the data cells. A solid line 501 illustrates the flow of data during the first mode of operation. A dashed line 503 illustrates the flow of control during the first mode of operation.

Figure 5:
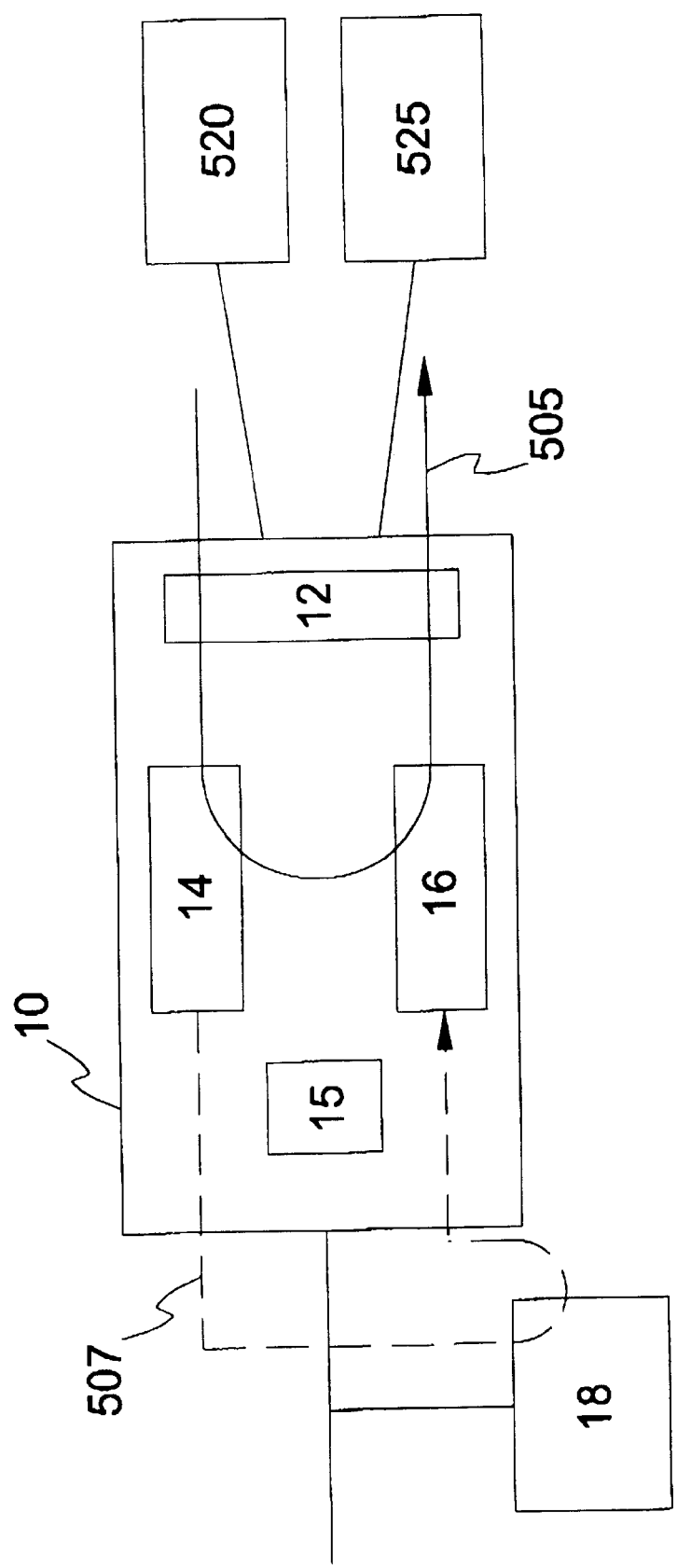
FIG. 5 is a block diagram of the apparatus of FIG. 3, illustrating the flow of data and control when a cell communication port communicates with packet communication port.

FIG. 5 is a block diagram of apparatus 10 operating in a second mode of operation. The second mode of operation is characterized by a cell-type physical device 520 as a communication source and a packet-type physical device 525 as a communication destination. Device 520 sends data cells to apparatus 10. Apparatus 10 reassembles the data cells into data packets and transmits the data packets to device 525. A solid line 505 illustrates the flow of data during the second mode of operation. A dashed line 507 illustrates the flow of control during the second mode of operation.

Figure 6:
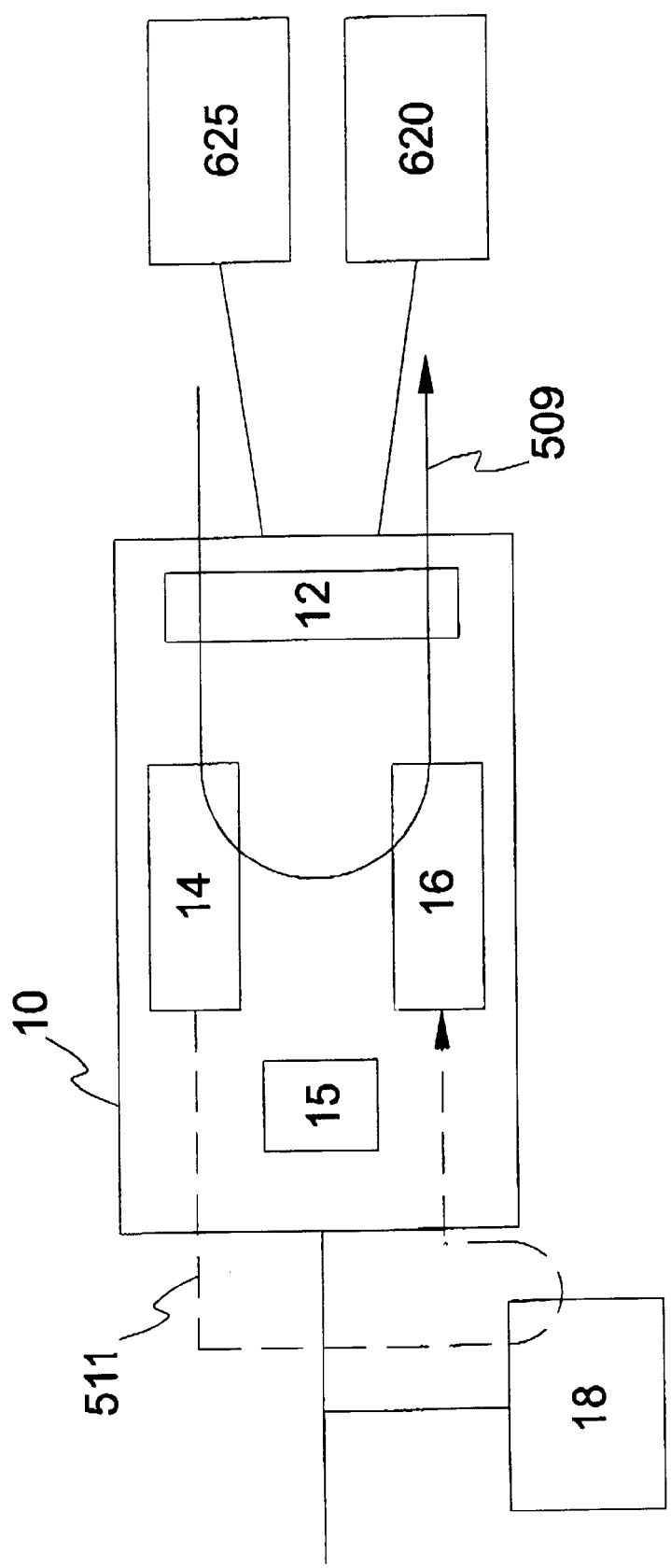
FIG. 6 is a block diagram of the apparatus of FIG. 3, illustrating the flow of data and control when a packet communication port communicates with cell communication port.

FIG. 6 is a block diagram of apparatus 10 operating in a third mode of operation. The third mode of operation is characterized by a packet-type physical device 625 as a communication source and a cell-type physical device 620 as a communication destination. Device 625 sends data packets to apparatus 10. Apparatus 10 segments the data packets into data cells and transmits data cells to device 620. A solid line 509 illustrates the flow of data during the third mode of operation. A dashed line 511 illustrates the flow of control during the third mode of operation.

Figure 7:
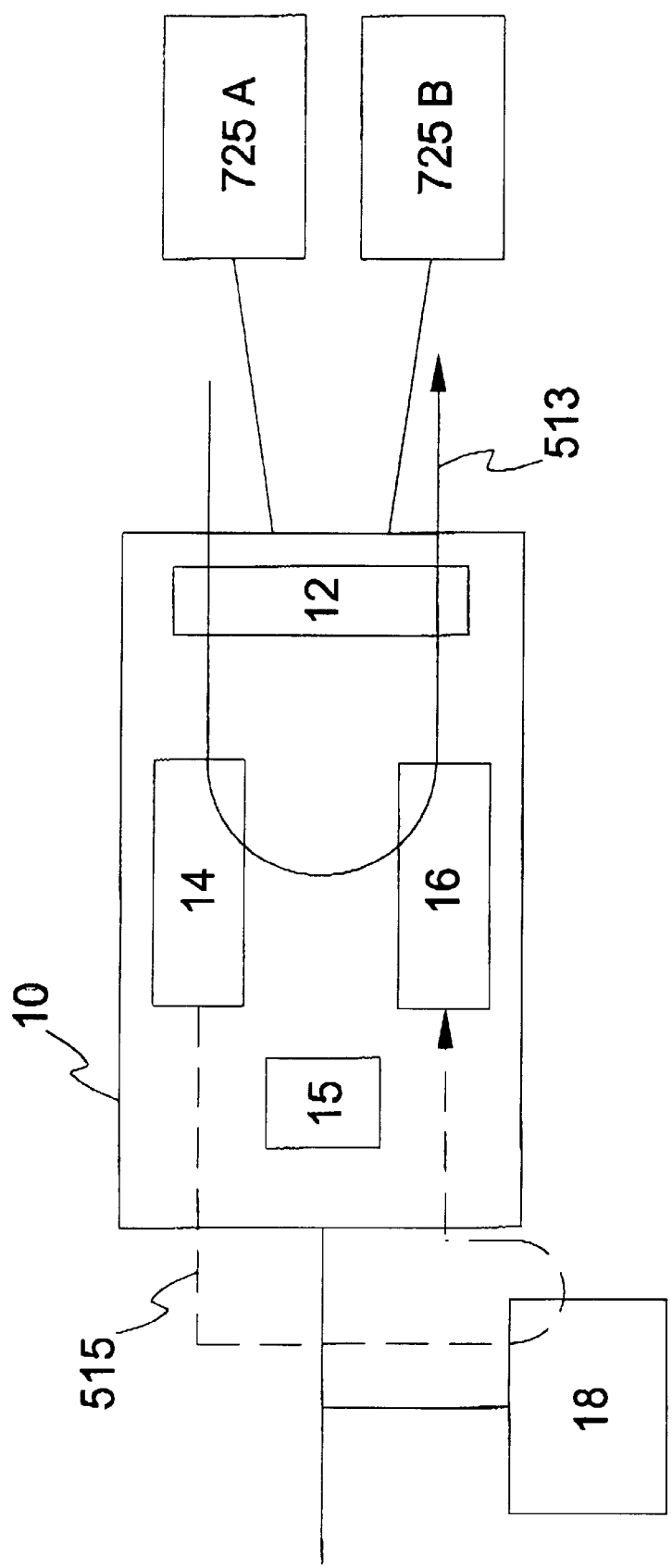
FIG. 7 is a block diagram of the apparatus of FIG. 3, illustrating the flow of data and control when a packet communication port communicates with another packet communication port.

FIG. 7 is a block diagram of apparatus 10 operating in a fourth mode of operation. The fourth mode of operation is characterized by a packet-type physical device 725A as a communication source and packet-type physical device 725B as a communication destination. Device 725A sends data packets to apparatus 10. Apparatus 10 operates as a switch by routing the data packets to device 725B. No segmentation or reassembly is performed on the data packets. A solid line 513 illustrates the flow of data during the fourth mode of operation. A dash line 515 illustrates the flow of control during the fourth mode of operation.

Figure 8:
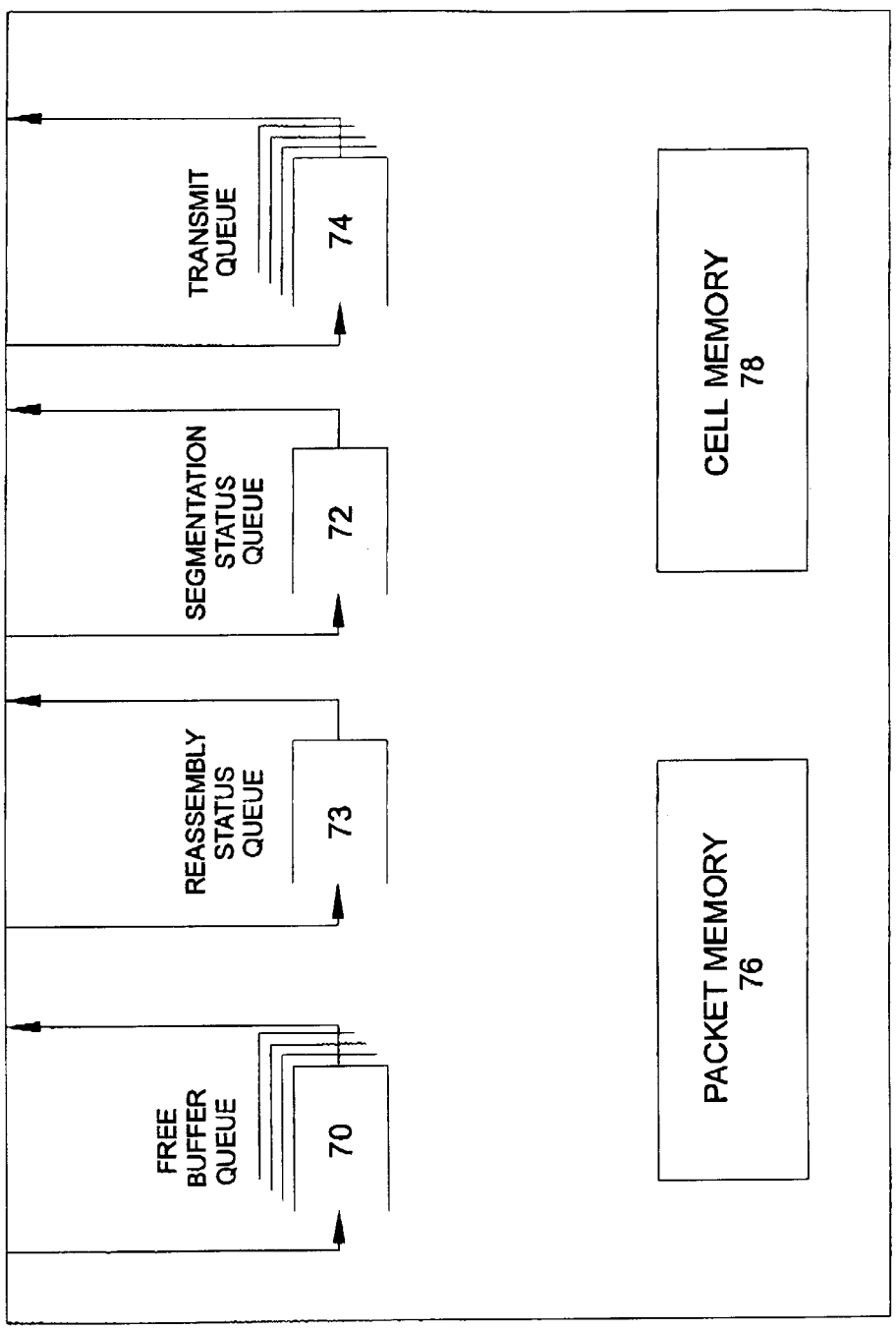
FIG. 8 is a block diagram of a memory used in an exemplary embodiment of the apparatus of FIG. 3.

FIG. 8 illustrates a block diagram of memory 18 used in an exemplary embodiment of apparatus 10. As provided in an RS8234 Service Segmentation and Reassembly Controller, manufactured by Conexant Systems, Inc., memory 18 includes free buffer queues 70, segmentation status queue 72, reassembly status queue 73, and transmit queues 74. Alternatively, memory 18 uses other data structures in lieu of queues 70, 72, 73, and 74.

In operation, queues 70, 72, 73, and 74 provide data and control information which fuels the reassembly, segmentation, and switching functions of apparatus 10. Queues 70, 72, 73, and 74 are placed on a communication path and directly associate processor 22 with apparatus 10 during reassembly and segmentation operations.

Free buffer queues 70 store the buffer descriptor of data units communicated to apparatus 10. During segmentation and reassembly operations, processor 22 posts location and availability of empty data buffers to free buffer queues 70. Reassembly block 14 uses the entries of free buffer queues 70 to retrieve empty data buffers in memory 18 for received data cells during reassembly. Reassembly block 14 places the buffer descriptors in reassembly status queue 73 where they are read by the processor 22.

During switching operations, free buffer queues 70 provide reassembly block 14 with a buffer descriptor identifying a buffer in memory 18. Contents of the received data cell are stored in the buffer identified by the buffer descriptor. A connection identifier and other data cell information are written to the buffer descriptor. Reassembly block 14 writes a buffer descriptor (which identifies the location of the buffer in memory 18) pointer directly to transmit queue 74. The data cells identified by the buffer descriptor are communicated from memory 18 to segmentation block 16 to interface 12 (FIG. 3). After the switching operation is completed (data cells or packets are transmitted), the buffer descriptor is returned to free buffer queue 70.

Processor 22 submits chains of segmentation buffer descriptors to transmit queue 74. Buffer descriptors identify the buffer in memory 18 containing data packet information to send to segmentation block 16 for segmentation. During switching, transmit queue 74 receives buffer descriptors from reassembly block 14.

Figure 9A:
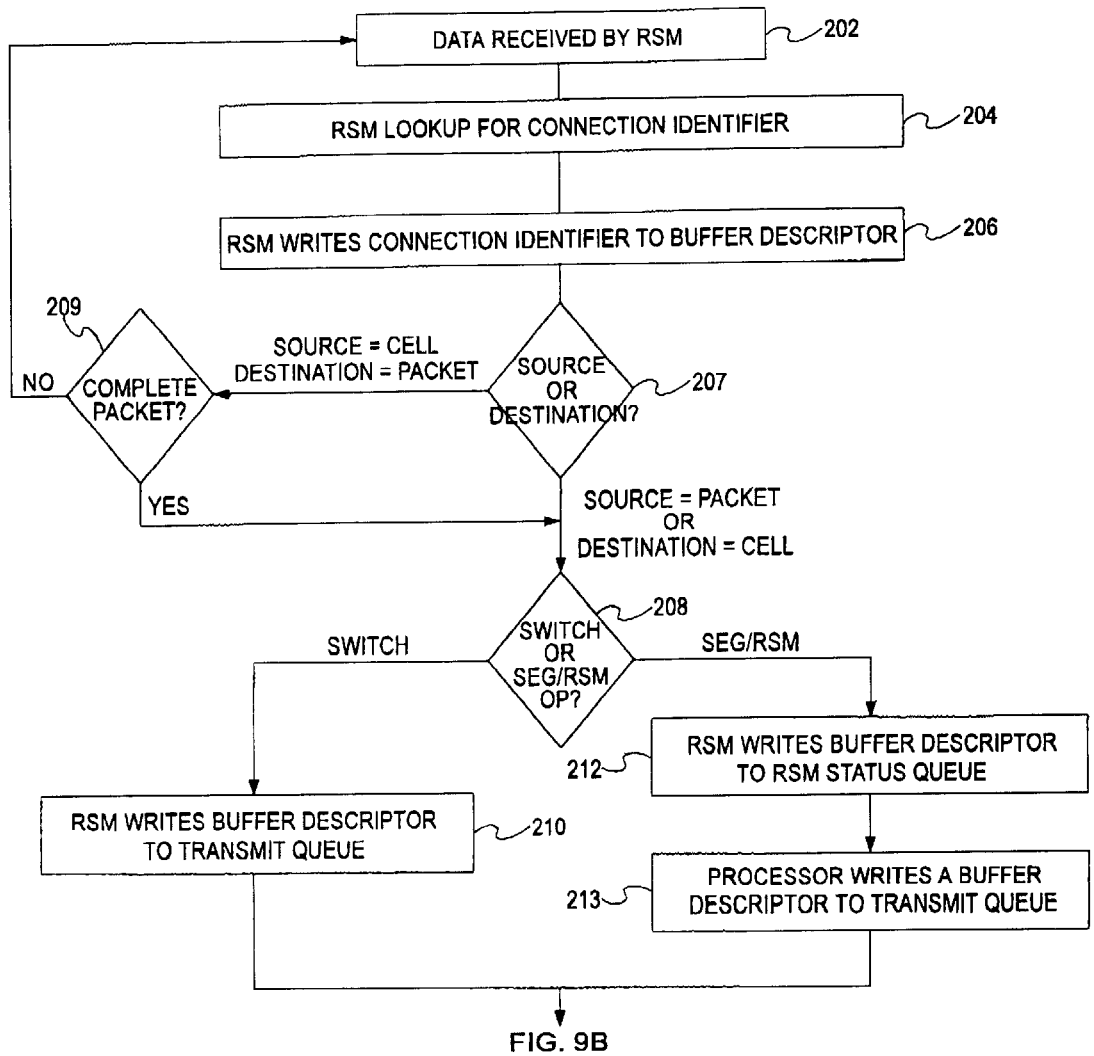
FIGS. 9A–B is a flow chart illustrating an exemplary method of operation for the apparatus illustrated in FIG. 3, including the integration of switching, segmentation and reassembly operations.
Figure 9B:
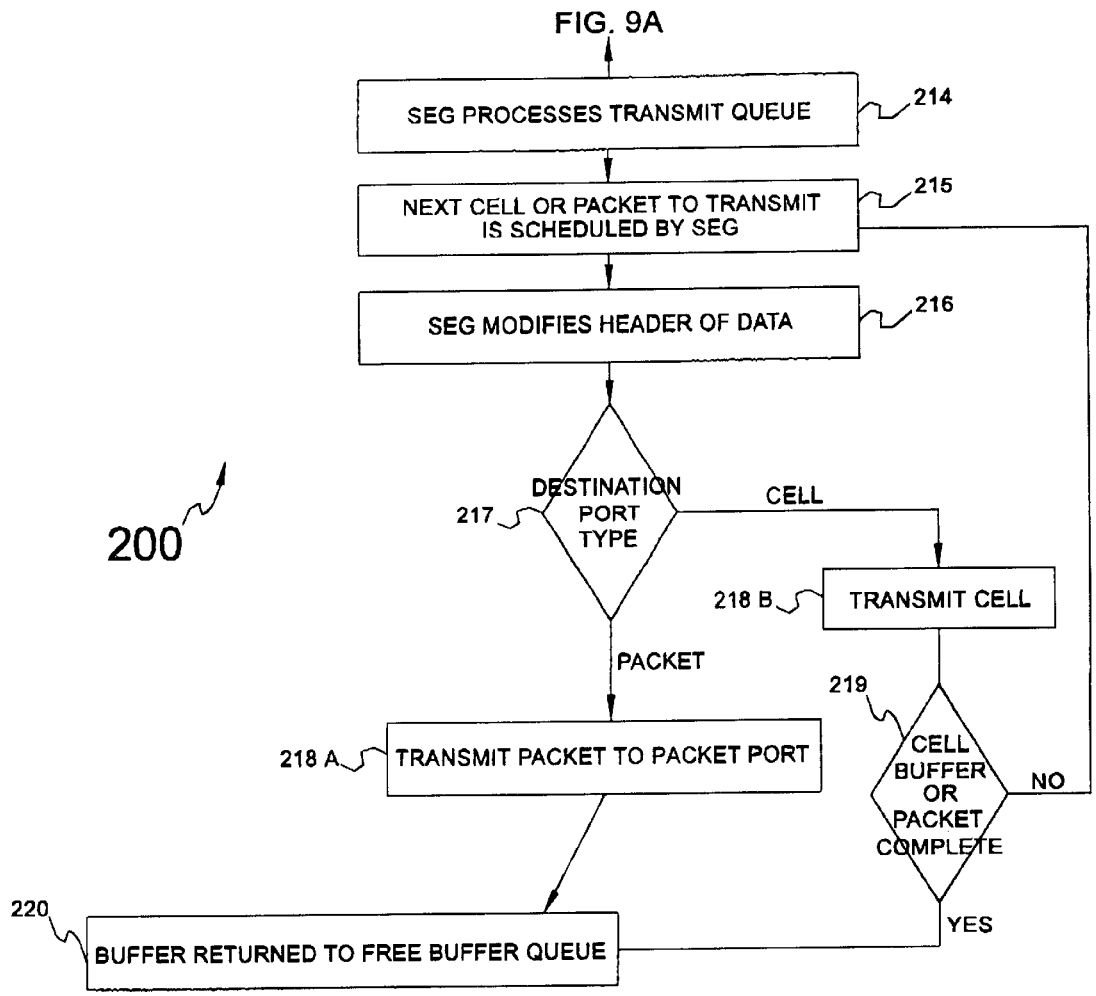

FIGS. 9A–B is a flowchart 200 illustrating an exemplary method of operation for apparatus 10, including the integration of switching, segmentation, and reassembly operations. At a step 202, a data cell or packet is received by reassembly block 14 (FIG. 3) from physical device 20 or 25. After step 202, a step 204 is performed where reassembly block 14 performs a lookup to assign the data cell or packet received to a connection identifier. The reassembly block 14 performs a connection identifier lookup from a table.

After step 204, a step 206 is performed where reassembly block 14 takes a buffer descriptor and buffer from the free buffer queue of memory 18. Reassembly block 14 writes the connection identifier to the buffer descriptor. If a data packet was received or the destination port belonging to this connection identifier transmits cells, a step 208 is performed. If a data cell was received and the destination port belonging to this connection identifier transmits packets or the destination is processor 22, the data cell is reassembled into a data packet at a step 209.

At step 208 reassembly block 14 determines from the connection identifier whether the operation to perform is a switch or a segmentation and reassembly. A switch does not include processor 22 in its channel, whereas reassembly and segmentation operations do. If the operation is a switch, a step 210 is performed. If the operation is a segmentation and reassembly, a step 212 and a step 213 are performed.

In step 210, reassembly block 14 sends a buffer descriptor to the transmit queue 74 of memory 18. In step 212 and step 213, apparatus 10 performs a conventional segmentation and reassembly operation, as disclosed in U.S. Pat. No. 5,768,275, issued on Jun. 16, 1998, to Lincoln et al. In step 212, reassembly block 14 writes the buffer descriptor to reassembly status queue 73. In step 213, processor 22 writes the buffer descriptor to transmit queue 74.

As an example of such a conventional reassembly operation, reassembly block 14 reads a free buffer from free buffer queue 70, writes data packet information into the buffer, and writes an index of the buffer to reassembly status queue 73. Processor 22 reads the index of the buffers in reassembly status queue 73, processes the data contained in the buffer, and writes the buffer back to free buffer queue 70. As an example of such a conventional segmentation operation, processor 22 writes buffer descriptors corresponding to the buffers to transmit queue 74.

After steps 210, 212, and 213, a step 214 is performed where the entries to transmit queue 74 are processed by segmentation block 16. After step 214, a step 215 is performed where schedule block 15 decides which connection will send the next data cell or packet. After step 215, a step 216 is performed where segmentation block 16 modifies the header belonging to the data cell or packet of this connection.

After step 216, a step 217 is performed where the destination port type is determined. If the destination port transmits data cells, cells are transmitted at step 218B and then a step 219 is performed. At step 219, complete transmission of all data cells of a packet is determined. Once the transmission is complete, a step 220 is performed. If the destination port transmits data packets, packets are transmitted in a step 218A and step 220 is performed. At step 220, the buffer corresponding to the transmitted data is returned to free buffer queue 220.

Applications for apparatus 10 as a switching SAR include an inexpensive ATM switch, a linear switch, a traffic shaper, an ADSL (asynchronous digital service line) multiplexer/demultiplexer (mux/demux), a multi-service ATM concentrator, an ATM to IP switch, and LANE/MPOA "bus" functions without microprocessor intervention.

Operating as an inexpensive ATM switch, apparatus 10 switches cells from one port to another port, while utilizing the SAR functionality for data management and signaling. Apparatus 10 is, in such an application, advantageously a small, low throughput ATM switch with few parts but capable of connecting to a variety of communication devices.

Operating as a traffic shaper, apparatus 10 is inserted between a transmitter and receiver in an ATM network in order to shape traffic from the transmitter to receiver. Traffic shaping provides for the communication by one device of a variety of different ATM service categories, including Constant Bit Rate (CBR), Variable Bit Rate (VBR) (both single and dual leaky bucket), Unspecified Bit Rate (UBR), Guaranteed Frame Rate (GFR), and Available Bit Rate (ABR). Apparatus 10 automatically schedules each connection according to user assigned parameters. Apparatus 10 includes a scheduler such as the scheduler disclosed in U.S. application Ser. No. 09/044,384, entitled "Apparatus and Method for Scheduling Multiple and Simultaneous Traffic in a Communication System," invented by Gemar and Andrews, incorporated herein by reference. Exemplary scheduling functions can be performed by RS8234 service segmentation and reassembly controller, manufactured by Conexant Systems, Inc.

Referring now to FIG. 1, apparatus 10 is included in a linear switch arrangement 80. As a linear switch, apparatus 10 is alternatively embedded in selected ATM nodes 52 of network 50 (FIG. 1). Implementation as a linear switch can advantageously be used in situations where a conventional "star" network topology is impractical. The "star" network topology employs some type of central management device or "hub" for connected nodes. Used as a linear switch, apparatus 10 can perform traffic shaping and management as a hub would, while not necessitating the conventional "star" topology. For example, apparatus 10 could have such an implementation in a production line for a manufacturing plant.

Operating as an ADSL mux/demux, apparatus 10 connects multiple communication devices to convert, for example, ADSL lines to a high speed SONET (synchronous optical network) and a SONET to ADSL lines. In such an embodiment, interface 12 couples apparatus 10 to multiple ADSL modems, one type of device 20. Apparatus 10 provides communication switching, termination, and generation operations needed in the SONET network. In another example of such an implementation, apparatus 10 performs the multiplexing of multiple xDSL (e.g., ADSL, SDSL, VDSL, RADSL, T1, E1, T3, E3, HDSL, HDSL2) lines into a single ATM port as well as the multiplexing of an ATM line into multiple xDSL lines.

Operating as a multi-service ATM concentrator, apparatus 10 multiplexes multiple ATM lines into a single ATM line. In such an embodiment, interface 12 connects apparatus 10 to multiple ATM lines as to combine the multiple ATM lines into a single ATM line. In yet another application, apparatus 10 operates as a MPOA/LANE "bus," receiving packets on one ATM virtual channel connection (VCC) and transmitting them on another ATM VCC. Operating as packet/ATM switch, apparatus 10 switches between packets and cells.

While the embodiments illustrated in the FIGURES and described above are presently preferred, it should be understood that these embodiments are offered by way of example only. Other embodiments may include, for example, functional blocks (e.g., an xBR Scheduler) which enhance its capabilities by providing data traffic shaping and management. The invention is not limited to a particular embodiment, but extends to various modifications, combinations, and permutations that nevertheless fall within the scope and spirit of the appended claims.

What is claimed is:

1. A communication system for communication of data in a network, and the system comprising:

a plurality of communication ports, the communication ports coupled to at least two physical layer devices;

an integrated switching, segmentation and reassembly device, the switching, segmentation and reassembly device routing and switching data associated with the data packets and the data cells to and from the communication ports and the at least one destination;

a memory, the memory storing the content of the data received from the plurality of communication ports and information on corresponding connection identifiers to the plurality of communication ports; and a processor coupled to the memory and the integrated switching, segmentation and reassembly device, wherein the integrated switching, segmentation and reassembly device is capable of operating in a first switch mode wherein a first data cell physical layer device of the at least two physical layer devices communicates a first data cell to a second data cell physical layer device of the at least two physical layer devices without intervention of the processor, wherein the integrated switching, segmentation and reassembly device is capable of operating in a second switch mode wherein a first data packet physical layer device of the at least two physical layer devices communicates a first data packet to a second data packet physical layer device of the at least two physical layer devices without intervention of the processor, wherein the integrated switching, segmentation and reassembly device is capable of operating in a reassemble mode wherein the first data cell physical layer device of the at least two physical layer devices communicates a second data cell to the first data packet physical layer device of the at least two physical layer devices, wherein the integrated switching, segmentation and reassembly device is capable of operating in a segmentation mode wherein the first packet physical layer device of the at least two physical layer devices communicates a second data packet to the first data cell physical layer device of the at least two physical layer devices, wherein memory includes a free buffer queue, segmentation status queue, a reassembly status queue, and a transmit queue, wherein the first switch mode and the second switch mode utilizes the free buffer queue and the transmit queue without using the reassembly status queue and the segmentation status queue to effect communication.

2. A communication system for communication of data in a network including any one of data packets associated with a packet switched network and data cells associated with a cell switched network, the system comprising:

a plurality of communication ports, the communication ports coupled to at least two physical layer devices an integrated switching, segmentation and reassembly device, the switching, segmentation and reassembly device routing the data to and from the communication ports and the at least one destination, the switching segmentation and reassembly device further switching the data between communication ports;

a memory; and a processor coupled to the memory and the integrated switching, segmentation and reassembly device, wherein the integrated switching, segmentation and reassembly device is capable of operating in a first switch mode wherein a first data cell physical layer device of the at least two physical layer devices communicates a first data cell to a second data cell physical layer device of the at least two physical layer devices without intervention of the processor, wherein the integrated switching, segmentation and reassembly device is capable of operating in a second switch mode wherein a first data packet physical layer device of the at least two physical layer devices communicates a first data packet to a second data packet physical layer device of the at least two physical layer devices without intervention of the processor, wherein the integrated switching, segmentation and reassembly device is capable of operating in a reassemble mode wherein the first data cell physical layer device of the at least two physical layer devices communicates a second data cell to the first data packet physical layer device of the at least two physical layer devices, wherein the integrated switching, segmentation and reassembly device is capable of operating in a segmentation mode wherein the first packet physical layer device of the at least two physical layer devices communicates a second data packet to the first data cell physical layer device of the at least two physical layer devices, wherein memory includes a free buffer queue, segmentation status queue, a reassembly status queue, and a transmit queue, wherein the first switch mode and the second switch mode utilizes the free buffer queue and the transmit queue without using the reassembly status queue and the segmentation status queue to effect communication, wherein the integrated switching, segmentation and reassembly device switches the data between communication ports by writing the contents of a plurality of buffers identified in the free buffer queue directly to the transmit queue.

3. A communication system for communication of data in a network including any one of data packets associated with a packet switched network and data cells associated with a cell switched network, the system comprising:

a plurality of communication ports, the communication ports coupled to at least four physical layer devices communicating data to and from the network and at least one destination, at least two of the physical layer devices communicating the data packets and at least two of the physical layer devices communicating the data cells;

a memory, the memory storing the content of the data received from the plurality of communication ports and information on corresponding connection identifiers to the plurality of ports;

a host processor;

an integrated switching, segmentation and reassembly device, the integrated switching, segmentation and reassembly device routing the data to and from the communication ports and the at least one destination, the integrated switching segmentation and reassembly device further switching the data between communication ports, and wherein the host processor is coupled to the memory and the integrated switching, segmentation and reassembly device, the integrated switching segmentation and reassembly device further comprises:

an interface, the interface coupling the plurality of communication ports to the integrated switching segmentation and reassembly device;

a reassembly block, the reassembly block assembling the data and writing the content of the received data to memory for future transmission;

a scheduler block, the scheduler block controlling the flow of the data to a corresponding destination port based on the corresponding connection identifier and appropriate specifications; and a segmentation block, the segmentation block segmenting the data packets and transmitting the data to the corresponding destination port;

wherein the integrated switching, segmentation and reassembly device is capable of operating in a first switch mode wherein a first data cell physical layer device of the at least two physical layer devices communicates a first data cell to a second data cell physical layer device of the at least two physical layer devices without intervention of the host processor, wherein the integrated switching, segmentation and reassembly device is capable of operating in a second switch mode wherein a first data packet physical layer device of the at least two physical layer devices communicates a first data packet to a second data packet physical layer device of the at least two physical layer devices without intervention of the host processor, wherein the integrated switching, segmentation and reassembly device is capable of operating in a reassemble mode wherein the first data cell physical layer device of the at least two physical layer devices communicates a second data cell to the first data packet physical layer device of the at least two physical layer devices, wherein the integrated switching, segmentation and reassembly device is capable of operating in a segmentation mode wherein the first packet physical layer device of the at least two physical layer devices communicates a second data packet to the first data cell physical layer device of the at least two physical layer devices, wherein memory includes a free buffer queue, segmentation status queue, a reassembly status queue, and a transmit queue, wherein the first switch mode and the second switch mode utilizes the free buffer queue and the transmit queue without using the reassembly status queue and the segmentation status queue to effect communication.

4. The communication system of claim 3, wherein the segmentation unit is used in the segmentation mode.

5. The communication system of claim 3, wherein the cell switched network associated with the communicated data is an asynchronous transfer mode (ATM) network.

6. The communication system of claim 3, wherein the data packets received from each of the plurality of communication ports by switching segmentation and reassembly device are reassembled and forwarded to the host microprocessor.

7. The communication system of claim 3, wherein the data packets received from each of the plurality of communication ports by the integrated switching, segmentation and reassembly device are forwarded to another communications port and then transmitted without intervention by the host microprocessor.

8. An integrated switching, segmentation and reassembly device for use in a communication system for communication of data in a network including any one of data packets associated with a packet switched network and data cells associated with a cell switched network, the communication system comprising: a processor and a memory, the integrated switching, segmentation and reassembly device comprising:

a plurality of communication ports, the communication ports for coupling to at least four physical layer devices communicating data to and from the network and at least one destination, at least two of the physical layer devices communicating the data packets and at least two of the physical layer devices communicating the data cells; the switching segmentation and reassembly device routing the data to and from the communication ports and the at least one destination, the switching segmentation and reassembly device further switching the data between communication ports, wherein the switching segmentation and reassembly device switches the data packets from a source packet port to a destination packet port without data segmentation and reassembly; and wherein the integrated switching, segmentation and reassembly device is capable of operating in a first switch mode wherein a first data cell physical layer device of the at least two physical layer devices communicates a first data cell to a second data cell physical layer device of the at least two physical layer devices without intervention of the processor, wherein the integrated switching, segmentation and reassembly device is capable of operating in a second switch mode wherein a first data packet physical layer device of the at least two physical layer devices communicates a first data packet to a second data packet physical layer device of the at least two physical layer devices without intervention of the processor, wherein the integrated switching, segmentation and reassembly device is capable of operating in a reassemble mode wherein the first data cell physical layer device of the at least two physical layer devices communicates a second data cell to the first data packet physical layer device of the at least two physical layer devices, wherein the integrated switching, segmentation and reassembly device is capable of operating in a segmentation mode wherein the first packet physical layer device of the at least two physical layer devices communicates a second data packet to the first data cell physical layer device of the at least two physical layer devices, wherein memory includes a free buffer queue, segmentation status queue, a reassembly status queue, and a transmit queue, wherein the first switch mode and the second switch mode utilizes the free buffer queue and the transmit queue without using the reassembly status queue and the segmentation status queue to effect communication.

9. A communication system for communication of data in a network including any one of data packets associated with a packet switched network and data cells associated with a cell switched network, the system comprising:

a plurality of communication ports, the communication ports coupled to at least four physical layer devices communicating data to and from the network and at least one destination, at least two of the physical layer devices communicating the data packets and at least two of the physical layer devices communicating the data cells;

a switching, segmentation and reassembly means, the switching, segmentation and reassembly means for routing the data to and from the communication ports and the at least one destination, the switching, segmentation and reassembly means for further switching the data between communication ports, wherein the switching segmentation and reassembly means switches the data cells from a source cell port to a destination cell port without data segmentation and reassembly; and a processor coupled to the memory and the integrated switching, segmentation and reassembly means, wherein the communication system is capable of operating in a first switch mode wherein a first data cell physical layer device of the at least two physical layer devices communicates a first data cell to a second data cell physical layer device of the at least two physical layer devices without intervention of the processor, wherein the communication system is capable of operating in a second switch mode wherein a first data packet physical layer device of the at least two physical layer devices communicates a first data packet to a second data packet physical layer device of the at least two physical layer devices without intervention of the processor, wherein the communication system is capable of operating in a reassemble mode wherein the first data cell physical layer device of the at least two physical layer devices communicates a second data cell to the first data packet physical layer device of the at least two physical layer devices, wherein the communication system is capable of operating in a segmentation mode wherein the first packet physical layer device of the at least two physical layer devices communicates a second data packet to the first data cell physical layer device of the at least two physical layer devices, wherein memory includes a free buffer queue, segmentation status queue, a reassembly status queue, and a transmit queue, wherein the first switch mode and the second switch mode utilizes the free buffer queue and the transmit queue without using the reassembly status queue and the segmentation status queue to effect communication.

10. The communication system of claim 9, wherein the switching, segmentation and reassembly means switches data packets from a source packet port to a destination cell port by segmenting data packets into data cells and transmitting data cells.

11. The communication system of claim 9, wherein the switching, segmentation and reassembly means switches data cells from a source cell port to a destination data packet port by reassembling the data cells into data packets and transmitting data packets.

12. A communication apparatus for communication of data in a network, the apparatus comprising:
  an interface, the interface coupling a plurality of communication ports to the communication apparatus, the communication ports communicating data packets with at least two devices and communicating data cells with at least two devices;
  a memory, the memory storing the content of data received from the plurality of communication ports and information on corresponding connection identifiers to the plurality of communication ports; and
  means for assembling data, processing the data from memory, writing the content of memory corresponding to the received data to memory for future transmission, segmenting data, and transmitting data to the corresponding destination port, the means for assembling, including an integrated switching, segmentation and reassembly device and a host processor;
  wherein the integrated switching, segmentation and reassembly device is capable of operating in a first switch mode wherein a first data cell physical layer device of the at least two physical layer devices communicates a first data cell to a second data cell physical layer device of the at least two physical layer devices without intervention of the host processor, wherein the integrated switching, segmentation and reassembly device is capable of operating in a second switch mode wherein a first data packet physical layer device of the at least two physical layer devices communicates a first data packet to a second data packet physical layer device of the at least two physical layer devices without intervention of the host processor, wherein the integrated switching, segmentation and reassembly device is capable of operating in a reassemble mode wherein the first data cell physical layer device of the at least two physical layer devices communicates a second data cell to the first data packet physical layer device of the at least two physical layer devices, wherein the integrated switching, segmentation and reassembly device is capable of operating in a segmentation mode wherein the first packet physical layer device of the at least two physical layer devices communicates a second data packet to the first data cell physical layer device of the at least two physical layer devices, wherein memory includes a free buffer queue, segmentation status queue, a reassembly status queue, and a transmit queue, wherein the first switch mode and the second switch mode utilizes the free buffer queue and the transmit queue without using the reassembly status queue and the segmentation status queue to effect communication.

13. The communication apparatus of claim 12, wherein the data received from each of the plurality of communication ports are reassembled and forwarded to the host microprocessor.

14. The communication apparatus of claim 12, wherein the data received from each of the plurality of communication ports are forwarded to another port and then transmitted without intervention by the host microprocessor.

15. A method for communication of data in a network including any one of data packets associated with a packet switched network and data cells associated with a cell switched network in a communication system from a source physical device to a destination physical device, wherein the integrated switching, segmentation and reassembly means includes at least four ports, wherein at least two ports receive data cells and at least two ports receive data packets, the communication system including a memory, a processor coupled to the memory and the integrated switching, segmentation and reassembly means, wherein the integrated switching, segmentation and reassembly means is capable of operating in a first switch mode wherein a first data cell physical layer device of the at least two physical layer devices communicates a first data cell to a second data cell physical layer device of the at least two physical layer devices without intervention of the processor, wherein the integrated switching, segmentation and reassembly means is capable of operating in a second switch mode wherein a first data packet physical layer device of the at least two physical layer devices communicates a first data packet to a second data packet physical layer device of the at least two physical layer devices without intervention of the processor, wherein the integrated switching, segmentation and reassembly means is capable of operating in a reassemble mode wherein the first data cell physical layer device of the at least two physical layer devices communicates a second data cell to the first data packet physical layer device of the at least two physical layer devices, wherein the communication system is capable of operating in a segmentation mode wherein the first packet physical layer device of the at least two physical layer devices communicates a second data packet to the first data cell physical layer device of the at least two physical layer devices, wherein memory includes a free buffer queue, segmentation status queue, a reassembly status queue, and a transmit queue, wherein the first switch mode and the second switch mode utilizes the free buffer queue and the transmit queue without using the reassembly status queue and the segmentation status queue to effect communication, the method comprising:

receiving data including a data header and payload from the source physical device with the integrated segmentation and reassembly device;

assigning the data received to a connection identifier with the integrated segmentation and reassembly device;

writing the connection identifier into a buffer descriptor and transmit queue with the integrated segmentation and reassembly device;

obtaining the connection identifier from the transmit queue with the integrated segmentation and reassembly device;

scheduling the connection identifier with the integrated segmentation and reassembly device; and making necessary changes to the data header, segmenting received data packets into cells, reassembling received cells into data packets, and communicating the data to the destination physical device as indicated by the connection identifier with the integrated segmentation and reassembly device.

16. The method of claim 15, wherein assigning the data received to a connection identifier is effected by performing a lookup.

17. The method of claim 15, further including switching data packets from a source packet physical device to a destination cell physical device by segmenting data packets into data cells and transmitting data cells.

18. The method of claim 15, further including switching data cells from a source cell physical device to a destination packet physical device by reassembling the data cells into data packets and transmitting data packets.

19. The method of claim 15, further including switching data to a destination physical device without data segmentation and reassembly where the source and destination physical devices are both any one of packet and cell communication physical devices.

20. The method of claim 15, wherein the data packets and the data cells received are shaped according to a quality of service traffic classification.

* * * * *